(12) United States Patent
Thompson et al.

(10) Patent No.: US 7,657,434 B2
(45) Date of Patent: Feb. 2, 2010

(54) FRAME GOALS FOR DIALOG SYSTEM

(75) Inventors: William K. Thompson, Evanston, IL (US); Harry M. Bliss, Evanston, IL (US)

(73) Assignee: Motorola, Inc., Schaumburg, IL (US)

( * ) Notice: Subject to any disclaimer, the term of this patent is extended or adjusted under 35 U.S.C. 154(b) by 630 days.

(21) Appl. No.: 11/421,024

(22) Filed: May 30, 2006

(65) Prior Publication Data

US 2007/0282606 A1   Dec. 6, 2007

(51) Int. Cl.
   *G10L 15/14* (2006.01)
(52) U.S. Cl. ..................................... 704/255
(58) Field of Classification Search .................. 704/255
   See application file for complete search history.

(56) References Cited

U.S. PATENT DOCUMENTS

| | | | |
|---|---|---|---|
| 4,068,298 A | 1/1978 | Dechant et al. | |
| 5,247,651 A | 9/1993 | Clarisse | |
| 5,412,756 A * | 5/1995 | Bauman et al. | ............. 706/45 |
| 5,652,714 A | 7/1997 | Peterson et al. | |
| 5,694,558 A | 12/1997 | Sparks et al. | |
| 5,790,898 A | 8/1998 | Kishima et al. | |
| 5,801,687 A | 9/1998 | Peterson et al. | |
| 5,835,688 A | 11/1998 | Fromherz | |
| 5,995,739 A | 11/1999 | Rotbart | |
| 6,234,964 B1 | 5/2001 | Lliff | |
| 6,324,496 B1 | 11/2001 | Alur et al. | |
| 6,513,006 B2 | 1/2003 | Howard et al. | |
| 6,770,029 B2 | 8/2004 | Lliff | |
| 6,880,147 B1 | 4/2005 | Pauly | |
| 6,996,800 B2 | 2/2006 | Lucassen et al. | |
| 7,020,850 B2 | 3/2006 | Raghavan et al. | |
| 7,206,805 B1 | 4/2007 | McLaughlin, Jr. | |
| 7,213,230 B2 | 5/2007 | Harel et al. | |
| 7,297,108 B2 | 11/2007 | Lliff | |
| 7,505,951 B2 * | 3/2009 | Thompson et al. | ............. 706/45 |
| 2002/0111965 A1 | 8/2002 | Kutter | |
| 2002/0167544 A1 | 11/2002 | Raghavan et al. | |
| 2002/0198719 A1 | 12/2002 | Gergic et al. | |
| 2003/0045281 A1 | 3/2003 | Rimoni | |
| 2003/0153998 A1 | 8/2003 | Clifford | |
| 2004/0003355 A1 | 1/2004 | Denbraber | |
| 2004/0085162 A1 | 5/2004 | Agarwal et al. | |

(Continued)

FOREIGN PATENT DOCUMENTS

WO    9829817    9/1998

OTHER PUBLICATIONS

James Allen, Donna Byron, Myroslava Dzikovska, George Ferguson, Lucian Galescu, and Amanda Stent, "Towards Conversational Human-Computer Interaction," AI Magazine, 2001.

(Continued)

*Primary Examiner*—Susan McFadden

(57) ABSTRACT

A frame definition for use by dialog system during an interaction with a user, the frame definition includes at least one data field and at least one goal comprising a Boolean function of one or more filled predicates, each of which takes a reference to a field of the frame as its argument. A goal is satisfied during a dialog if the Boolean function evaluates to true. A goal may be used to control the focus of the interaction.

10 Claims, 4 Drawing Sheets

U.S. PATENT DOCUMENTS

| | | |
|---|---|---|
| 2005/0004786 A1 | 1/2005 | Thomason |
| 2005/0086382 A1 | 4/2005 | Ramaswamy et al. |
| 2005/0257051 A1 | 11/2005 | Richard |
| 2006/0036770 A1 | 2/2006 | Hosn et al. |
| 2006/0221081 A1 | 10/2006 | Cohen et al. |
| 2007/0074184 A1 | 3/2007 | Raghavan et al. |
| 2007/0282570 A1 | 12/2007 | Thompson et al. |
| 2007/0282593 A1 | 12/2007 | Thompson et al. |
| 2008/0046817 A1 | 2/2008 | Sharp et al. |
| 2008/0071714 A1 | 3/2008 | Menich et al. |

OTHER PUBLICATIONS

David Harel, Statecharts: A Visual Formalism for Complex Systems, Sci. Comput. Programming, 8 (1987), 231-274.

State Chart XML (SCXML): State Machine Notation for Control Abstraction, W3C Working draft, http://www.w3.org/TR/scxml/ (Section 2), Jan. 24, 2006.

Voice Extensible Markup Language (VoiceXML) Version 2.0, W3C Recommendation Mar. 14, 2006, http://www.w3.org/TR/voicexml20/ (Section 1).

Xforms 1.0 (Second edition), W3C Recommendation Mar. 14, 2006, http://www.w3.org/TR/xforms/ (Section 2).

Rudnicky, A. and Xu W. An agenda-based dialog management architecture for spoken language systems. IEEE Automatic Speech Recognition and Understanding Workshop, 1999, p. I-337.

Constantinides, P., Hansma, S., Tchou, C. and Rudnicky, A. A schema-based approach to dialog control Proceedings of ICSLP. 1998, Paper 637.

William Thompson, Harry Bliss , A Declarative Framework for Building Compositional Dialog Modules, Sixth International Conference on Spoken Language Processing (ICSLP 2000), Beijing, China, Oct. 16-20, 2000.

Goddeau, D., Meng, H., Polifroni, J., Seneff, S., and Busayapongchai, S. (1996). A formbased dialogue manager for spoken language applications. In Proceedings of the International Conference on Spoken Language Processing, vol. 2, pp. 701-704, Philadelphia, PA. IEEE.

Hardy, H., Strzalkowski, T., Wu, M., Dialogue management for an automated multilingual call center ,Proceedings of the HLT-NAACL 2003 workshop on Research directions in dialogue processing—vol. 7 Edmonton, Alberta, Canada pp. 10-12 2003.

U.S. Appl. No. 11/420,995, filed May 30, 2006, Thompson et al.

U.S. Appl. No. 11/421,012, filed May 30, 2006, Thompson et al.

U.S. Appl. No. 11/611,288, filed Dec. 15, 2006, Davis et al.

Scott McGlashan, et al., "Voice Extensible Markup Language (VoiceXML) Version 2.0, Section 2-Dialog Constructs" W3C Recommendation, Mar. 16, 2004, 1-64.

William Thompson and Harry Bliss, "A Declarative Framework for Building Compositional Dialog Modules", Proceedings of ICSLP 2000, 1-4, Beijing.

P. Constantinides, S. Hansma, and A. Rudnicky, "A Schema Based Approach to Dialog Control", Proceedings of ICSLP, 1998, 409-412, Beijing.

A. Rudnicky and Xu W., "An Agenda-Based Dialog Management Architecture For Spoken Language Systems", IEEE Automatic Speech Recognition and Understanding Workshop, 1999, 3-.

David Goddeau, et al., "A Form-Based Dialogue Manager for Spoken Language Applications," Proceedings of ICSLP, 701-704, 1996.

Hilda Hardy, et al., "Dialogue Management for an Automated Multilingual Call Center", Proceedings of HLT-NAACL 2003 Workshop: Research Directions in Dialogue Processing, 10-12.

Ioannis Toptsis, Shuyin Li, Britta Wrede, Gernot A Fink, "A Multimodal Dialog System for a Mobile Robot", accepted for INTERSPEECH 2004 (ICSLP), 8th International Conference.

Bolchini et al., "Interactive Dialogue Model: A Design Technique for Multichannel Applications," IEEE Transaction on Multimedia, vol. 8, Issue 3, Jun. 2006, pp. 529-541.

Curtis et al., "Designing Interfaces for the Organization," IEEE Software, vol. 12, Issue 6, Nov. 1995, pp. 99-100.

Machias et al., "An Expert System Approach to Designing and Testing Substation Grounding Grids," IEEE Transactions on Power Delivery, vol. 4, Issue 1, Jan. 1999, pp. 234-240.

Bourbakis et al., "Analysis of Invariant Meta-Features for Learning and Understanding Disabled Peoples Behavior Related to Their Health Conditions," Sixth IEEE Symposium on Bioinformatics and Bioengineering, 2006, BIBE 2006, Oct. 2006, pp. 357-369.

Gao et al., "Portability Challenges in Developing Interactive Dialogue Systems," Proceedings of the IEEE International Conference on Acoustics, Speech and Signal Processing, 2005, ICASSP '05, Mar. 18-23, 2005, vol. 5, pp. 1017-1020.

Guerrieri, "Case Study: Digital's Application Generator," IEEE Software, vol. 11, Issue 5, Sep. 1994, pp. 95-96.

Guoray, "Formalizing Analytical Disclosure in Visual Analytics," IEEE Symposium on Visual Analytics Science and Technology, 2007, VAST 2007, Oct. 30-Nov. 1, 2007, pp. 217-218.

Hanau et al., "A Prototyping and Simulation Approach to Interactive Computer System Design," 17th Conference on Design Automation, Jun. 23-25, 1980, pp. 572-578.

Harel et al., "Executable Object Modeling with Statecharts," IEEE Press, Computer 30:7, Jul. 2997, pp. 31-42.

Ricano et al., "User Preferences for Effective Task Completion While Interacting with a Robotic Conversational Animated Face," IEEE International Workshop on Robot and Human Interactive Communication, 2005, ROMAN 2005, Aug. 13-15, 2005, pp. 478-483.

Slator, "Tools for Managing Stories and Questions," Proceedings of the Sixth International Conference on Tools with Artificial Intelligence, Nov. 6-9, 1994, pp. 237-238.

Auburn et al., "State Chart XML (SCXML):State Machine Notation for Control Abstraction 1.0," W3C Working Draft, Jul. 5, 2005, www.w3.org/TR/2005/WD-scxml-20050705, pp. 1-54.

Wang et al., "The Application of DBL Algorithm in Distributed Speech Dialogue System," Proceedings of the IEEE International Conference on Roboticem Intelligent Systems and Signal Processing, 2003, Oct. 8-13, 2003, vol. 2, pp. 1273-1277.

Yurtseven et al. "Invited Panel—Engineering Technology Eduction in an Era of Globalization," Proceedings of the 35th Annual Conference on Frontiers in Education, 2005, FIE '05, Oct. 19-22, 2005, pp. F4B-1-3.

Giese et al., "Real-Time Statechart Semantics," Software Engineering Group, University of Paderborn, Germany, Jun. 2, 2003.

Duarte Nuno Jardin Nunes, "Object Modeling for User-Centered Development and User Interface Design: The Wisdom Approach," Universidade da Madeira, Funchal—Portugal, Apr. 2001.

French et al., "Generating User Interface from Composite Schemas," Proceedings of XML, 2003.

Auburn et al., "Voice Browser Call Control: CCXML Version 1.0," W3C Working draft, Jan. 19, 2007, http://www.w3.org/TR/ccxml/ (Sections 1 and 2) pp. 1-8.

* cited by examiner

```xml
<?xml version="1.0" encoding="UTF-8"?>
<vxml version="2.0" xmlns="http://www.w3.org/2001/vxml"
  xmlns:xsi="http://www.w3.org/2001/XMLSchema-instance"
  xsi:schemaLocation="http://www.w3.org/2001/vxml
    http://www.w3.org/TR/voicexml20/vxml.xsd">
<form>
  <block>
    We need a few more details to complete your order.
  </block>
  <field name="color">
    <prompt>Which color?</prompt>
    <option>red</option>
    <option>blue</option>
    <option>green</option>
  </field>
  <field name="size">
    <prompt>Which size?</prompt>
    <option>small</option>
    <option>medium</option>
    <option>large</option>
  </field>
  <field name="quantity">
    <grammar type="application/srgs+xml" src="/grammars/number.grxml"/>
    <prompt>How many?</prompt>
  </field>
  <block>
    Thank you.  Your order is being processed.
    <submit next="details.cgi" namelist="color size quantity"/>
  </block>
  <catch event="help nomatch">
    Your options are <enumerate/>.
  </catch>
</form>
</vxml>
```

*FIG. 1*

```
;;;;;;;;;;;;;;;;;;;;;;;;;;;;;;;;;;;;
;;;;;;;;;;;;;;;;;;;;;;;;;;;;;;;;;;;;
;; Flight Info Form            ;;
;;;;;;;;;;;;;;;;;;;;;;;;;;;;;;;;;;;;
(form
  :name FlightInfo
  :grammar Flight
  :prompt askFlightInfo ;; FlightInfo Fields
    (fields
       (field  :name arrTime
               :type Time
               :grammar ArriveTime
               :prompt askArrTime)
       (field  :name deptTime
               :type Time
               :grammar DepartTime
               :prompt askDeptTime)
       (field  :name arrCity
               :type City
               :grammar ArriveCity
               :prompt askArrCity)
       (field  :name DeptCity
               :type City
               :grammar DepartCity
               :prompt askDeptCity)
    )

;; FlightInfo Goals
    (goals
       (goal  (filled @deptTime)
              (filled @deptCity))
       (goal  (filled @arrTime)
              (filled @arrCity))
    )
)
```

*FIG. 2*

FRAME GOALS FOR DIALOG SYSTEM

CROSS REFERENCE TO RELATED APPLICATIONS

This application is related to co-pending U.S. patent application Ser. No. 11/420,995, titled "Hierarchial State Machine Generation for Interaction Management Using Goal Specifications", and Ser. No. 11/421,012 titled "Statechart Generation Using Frames", both filed even date herewith

BACKGROUND

In an interactive system, a dialog is a series of inquires and responses between a computer and a user that allows the computer to obtain information from and deliver information to the user. Many techniques currently exist for specifying dialog control logic in voice and multimodal dialog systems. At the lowest level of representational sophistication are finite-state scripts that explicitly enumerate the various states and transitions. At a higher level of complexity are frame-based techniques. The metaphor behind frame-based dialog control logic is that of form-filling, that is, the system requires certain pieces of information from the user in order to accomplish some domain specific task (such as booking a flight, finding a restaurant, or finding out who you want to call on the phone). The advantage of frame-based techniques over finite-state scripts is that they enable a dialog designer to create a relatively complex dialog in a more compact format. A frame compactly represents a large number of states by eliminating much of the explicit process logic that is required in finite-state machines. This is because the fields of a frame can typically be filled in any order, and an interaction manager (IM) will use the current completion state of a frame in order to decide what remaining information it needs to get from the user. This typically leads to a more mixed-initiative, and flexible interaction than that obtained from a finite-state script.

A dialog system typically prompts the user for discrete pieces of information in a pre-determined order such as a credit card number followed by an expiration date. For the user, this can become quite cumbersome, especially when she is accustomed to providing multiple pieces of information in succession without the interruption of intermediary prompts. In addition, the caller may desire to provide the pieces of information in a different order than specified by the application. Mixed-initiative dialogs address both of these issues by allowing the flow of the call to be directed by the user as well as by the application.

Frame-based techniques are not the most powerful technique for specifying dialog control logic. Other techniques, such as plan-based and agent-based models, are more powerful However, frame-based techniques have the advantage of simplicity compared to these approaches, and are thus appropriate for specifying certain limited kinds of dialogs. Another reason for the current popularity of frames is the existence of a World Wide Web Consortium, Voice Extensible Markup Language (W3C VoiceXML 2.0) standard. The VoiceXML 2.0 standard adopts a frame-based approach. In the VoiceXML standard, frames come in two varieties, "forms", and "menus". An example of a VoiceXML form 100 is shown in FIG. 1. An example of a frame specified in the Motorola Portable Dialog Frame Language (MPD-FL) is shown in FIG. 2.

The embodiments presented below will be described in terms of frames of the sort shown in FIG. 1 and in FIG. 2.

FIG. 1 demonstrates that a form consists of several subparts, including a set of "fields". These fields are analogous to variables, with mutable state. The goal of a dialog is to fill all of these fields by interacting with a user. How this interaction proceeds is determined by the structure of the form and by the "Form Interpretation Algorithm" (FIA) used to interpret the form. For VoiceXML, for example, the default is for the FIA to visit each field in the order in which it appears in the form. In FIG. 1, this means (1) color, (2) size, and (3) quantity. If a dialog designer wants to change the order in which the fields are visited, he can do one of two things. The designer can re-arrange the order of the fields, or he can specify explicit control logic in the form. Taking the latter option, the designer could, for example, specify a construct on the "color" field indicating that if "color" has the value "red", then skip "size" and go directly to "quantity". This is done using an 'if-then' construct supplied by VoiceXML. The same mechanism must be used if the designer wants to by-pass the FIA. If, for example, only 2 out of 3 fields need to be completed, the designer would need to add explicit control logic in order to have the FIA exit the frame when this contingency holds.

When a frame is large, containing a relatively large number of fields, the explicit control logic for the cases described above can involve considerable complexity, reducing the utility of using a frame-based language for specifying dialogs, and reducing maintainability and extensibility. To the extent that explicit control logic is being used, the frame-based language becomes less declarative, more procedural, and more equivalent to a lower-level finite state script.

BRIEF DESCRIPTION OF THE DRAWINGS

The novel features believed characteristic of the invention are set forth in the appended claims. The invention itself, however, as well as the preferred mode of use, and further objects and advantages thereof, will best be understood by reference to the following detailed description of an illustrative embodiment when read in conjunction with the accompanying drawing(s), wherein:

FIG. 1 is an exemplary VoiceXML form.

FIG. 2 is an exemplary MPD-FL frame definition including declarative goal information.

DETAILED DESCRIPTION

Figure 3:
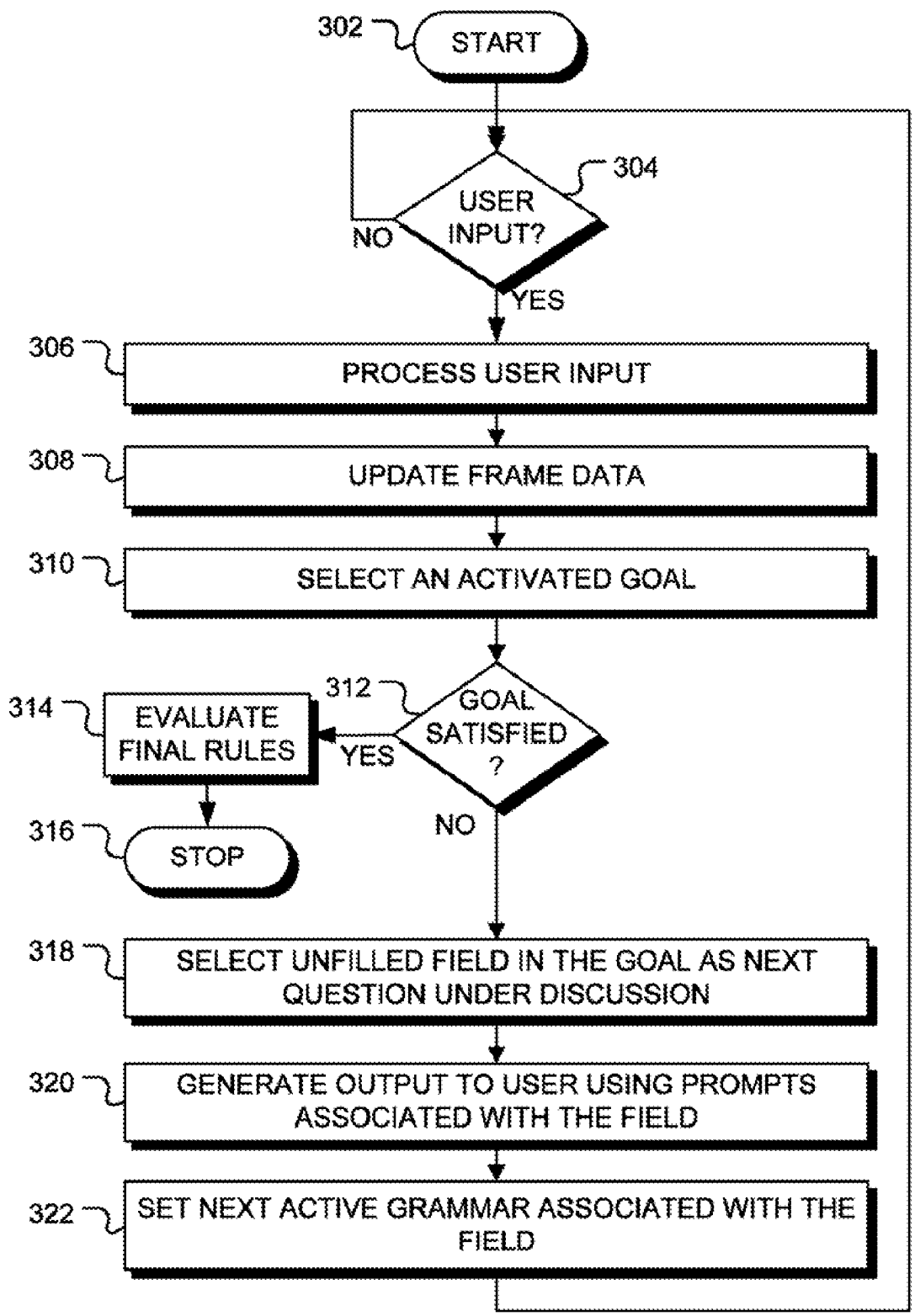
FIG. 3 is a flow chart of a method for interpreting frames that include declarative goal information, consistent with certain embodiments of the invention.

While this invention is susceptible of embodiment in many different forms, there is shown in the drawings and will herein be described in detail one or more specific embodiments, with the understanding that the present disclosure is to be considered as exemplary of the principles of the invention and not intended to limit the invention to the specific embodiments shown and described. In the description below, like reference numerals are used to describe the same, similar or corresponding parts in the several views of the drawings.

Frame design can be simplified by eliminating at least some of the procedural control logic. In one embodiment of the invention, declarative goal information is added to a frame definition and the corresponding Frame Interpretation Algorithm (FIA) is modified in order to use this goal information. This reduces the need to augment a frame definition with additional procedural control logic, thereby simplifying frame design. The goal information explicitly specifies a user goal as a Boolean expression of predicates over the fields of a frame. Goals can be expressed as disjunctions of conjunctions of positive (i.e., non-negated) predicates over the fields of a form. This is a version of Disjunctive Normal Form (DNF), in which only positive (non-negative) predicates are used. This entails no loss of generality, since any Boolean combination of non-negative expressions can be converted to a DNF expression.

Goal information has been used in frames to determine if the frame data is complete. However, goal information has not been used previously to control an interaction.

Dialog systems find application in many areas including, but not limited to: automotive systems, audio/video equipment, appliances, computers, home automation systems, fire alarm systems, burglar alarm systems, telephone systems, intercom systems, gateway systems and internet access systems. In general, a dialog system may find application in any domain in which a well-specified task must be achieved, and which involves communicating with a user in order to obtain or provide information relevant to achieving the task.

The Motorola Portable Dialog (MPD) system of the Motorola Corporation is an example of a dialog system that includes frames. MPD frames can be defined by using the textual Motorola Portable Dialog Frame Language (MPD-FL). An example of an MPD-FL representation of a frame 200 with goals is shown in FIG. 2. In this example, the frame definition 200 is a form. The form 200 describes an exemplary dialog, involving obtaining flight information using an automated system. The form 200 contains both fields 202 and goals 204. The four fields: (1) arrTime, (2) arrCity, (3) deptTime, and (4) deptCity, hold information about arrival time, arrival city, departure time, and departure city, respectively. The form also specifies two goals 204. The first goal contains "filled" predicates referring to the deptTime and deptCity fields. The second goal contains filled predicates referring to the arrTime and arrCity fields. These are to be interpreted as follows: "If the deptTime and deptCity fields are filled (i.e., set to a single non-null value), then the FlightInfo frame is complete, also, if the arrTime and arrCity fields are filled, then the FlightInfo frame is complete. Otherwise, the FlightInfo frame is not complete, and more interaction with the user may be needed in order to fill in the required values". Here, a "predicate" is a function that returns true or false as its value. Thus a "filled predicate" is a function that returns the value true if the field referred to by the argument is filled, and returns false otherwise.

A frame contains zero or more goals. Each goal consists of one or more filled predicates, each of which takes a reference to a field as its argument. The filled predicate evaluates to false if its argument is not set to a single legitimate value. It evaluates to true otherwise. The dialog system interprets the set of goals as a logical formula in Disjunctive Normal Form (DNF). That is, a frame is satisfied if and only if any one of its goals is satisfied. A goal is satisfied if and only if every filled predicate in the goal evaluates to true. It should be noted that representation of goals is not limited to DNF. For example, goals can be represented in other forms such as general Boolean expressions, mathematical expressions or the like, or forms used in combination.

Goal satisfaction is a recursive notion. The value of a field can be either an atomic value, or a complex value consisting of another form or sub-frame. In the former case, the field is filled if it is set to a single atomic value (e.g., a string or a Boolean value). In the latter case, the field is filled only if its form value is satisfied. The embedded form can contain its own goals, implying a recursive clause to the definition of satisfaction.

FIG. 3 is a flow chart of a method for interpreting frames that includes declarative goal information, consistent with certain aspects of the present invention. The method uses the goal information in order to select the next topic, when the system has the initiative, and in order to judge when a dialog or sub-dialog is completed.

Referring to FIG. 3, following start block 302, a user has the initiative in the dialog (i.e., the dialog system is waiting for the user to say something). The user may say anything permitted by the grammar. The grammar may be specified in order to allow the user to fill in any of the fields in the frame. At decision block 304, the dialog system waits for user input, as depicted by the negative branch from decision block 304. At block 306, the dialog system processes the user input (by interpreting a user utterance or other input). After updating the frame data at block 308, the dialog system decides what to do next, based on activated goals. Frame data is the data associated with the fields in the frame definition during a dialog. A goal is activated if one of the fields referred to inside of it has been modified. If more than one goal has been activated, the dialog system will select the first activated goal based, for example, on the lexical order of the goals inside of the frame definition. The dialog system selects an activated goal at block 310. At decision block 312, the dialog system determines if the activated goal is satisfied. Goal satisfaction is a recursive notion. The value of a field can be either an atomic value, or a complex value consisting of another form. In the former case, the field is filled if it is set to a single atomic value (e.g., a string or a Boolean value). In the latter case, the field is filled only if its form value is satisfied. The embedded form can contain its own goals, implying a recursive clause to the definition of satisfaction. Thus, the goals are hierarchical. If one or more goals have been satisfied, as indicated by the positive branch from decision block 312, the dialog system judges the associated form to be completed. The dialog system will then evaluate any final rules in the form at block 314, and will exit the form at termination block 316. If the activated goal is not satisfied, as indicated by the negative branch from decision block 312, the dialog system will select the first unsatisfied field inside of the first activated goal as the next question under discussion at block 318. At block 320, the prompts associated with this field are used to generate the next output to the user. The output to the user may be in audible or visual form, for example. At block 322 the next active grammar is set. The flow then continues to block 304 to wait for user input. If the field so selected is complex (i.e., contains a form as its value), then the procedures described here apply recursively.

In a mixed-initiative scenario, the user may decide to pursue a different goal than that which the system is following. This is permitted by the dialog system FIA. If the user updates the frame data in such a way that an alternative goal is activated, the system will detect this and use the newly activated goal in order to guide the dialog.

Figure 4:
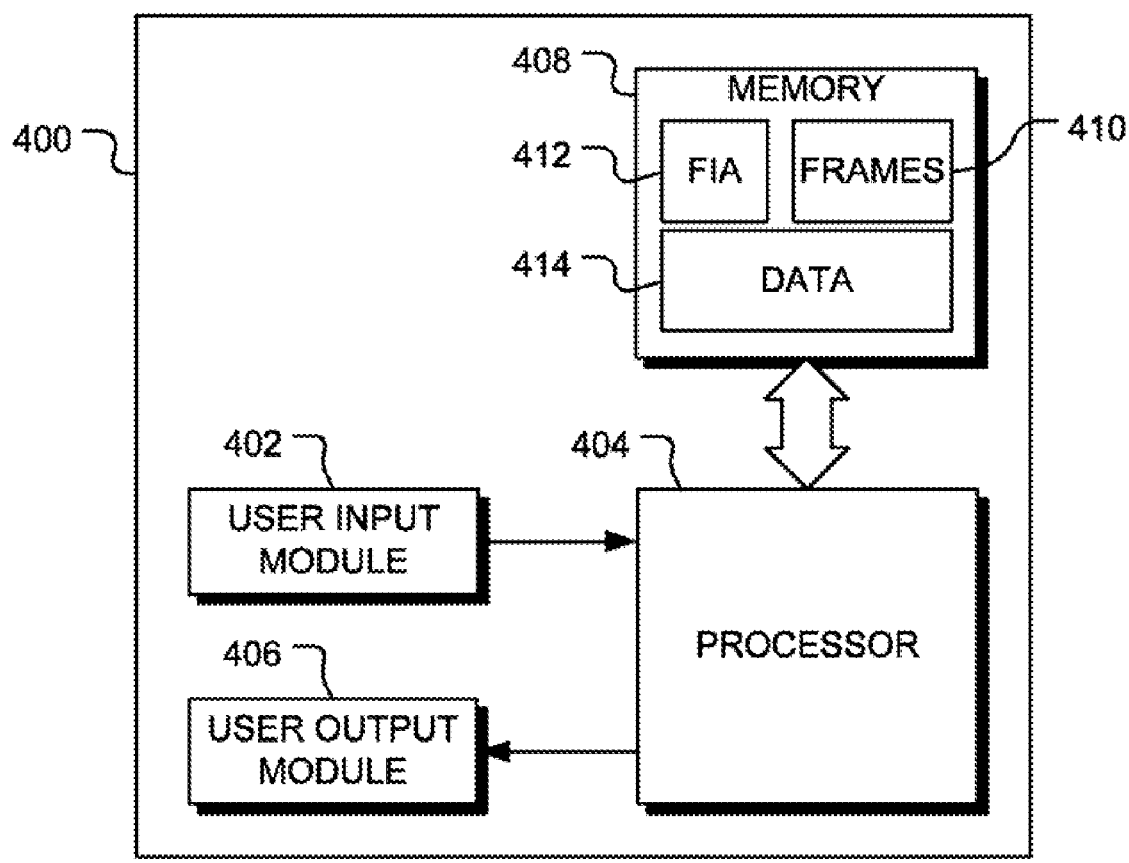
FIG. 4 is a diagram of a system for interpreting frames that include declarative goal information, consistent with certain embodiments of the invention.

FIG. 4 is a diagram of a system for interpreting frames that includes declarative goal information, consistent with certain embodiments of the invention. The system 400 includes a user input module 402 for receiving input from a user. The user input module may be, for example, a microphone with appropriate signal conditioning and sampling circuits, a keyboard or a computer mouse. The user input is processed by processor 404 that also generates an output to the user via user output module 406. The output module may be, for example, a loudspeaker, together with appropriate signal generation and amplification circuits, or a visual display. The processor is operationally coupled to a memory 408 that stores one or more frame definitions 410, a software implementation 412 of a frame interpretation algorithm (FIA), and frame data 414 associated with the fields of the frames. The processor executes the FIA, which interprets the frame definitions 410 to control a dialog with the user. Based on user input, the processor updates the frame data 414.

The addition of declarative goals to frame definitions, and the use of a Frame Interpretation Algorithm (FIA) that interprets these goals appropriately, solves the two related problems specified above. Firstly, the declarative goals are used to judge when a frame has been completed. Frame data is completed whenever a goal is satisfied, whether or not all of the fields defined in the frame definition have been filled. This eliminates the need to add explicit control logic to perform this task. Secondly, the declarative goals are used by the FIA in order to decide what topic to pursue next, when the system has the initiative. By referring to activated goals, the system can determine that certain subsets of fields in a frame are related to each other in a way that can be used to determine the current question under discussion. A user activates a goal by filling in one of the relevant fields. The system is flexible enough to pursue a new goal if the user updates a field that appears in a goal other than the one the system was pursuing.

The present invention, as described in embodiments herein, is implemented using a programmed processor executing programming instructions that are broadly described above in flow chart form that can be stored on any suitable electronic storage medium. However, those skilled in the art will appreciate that the processes described above can be implemented in any number of variations and in many suitable programming languages without departing from the present invention. For example, the order of certain operations carried out can often be varied, additional operations can be added or operations can be deleted without departing from the invention. Error trapping can be added and/or enhanced and variations can be made in user interface and information presentation without departing from the present invention. Such variations are contemplated and considered equivalent.

While the invention has been described in conjunction with specific embodiments, it is evident that many alternatives, modifications, permutations and variations will become apparent to those of ordinary skill in the art in light of the foregoing description. Accordingly, it is intended that the present invention embrace all such alternatives, modifications and variations as fall within the scope of the appended claims.

What is claimed is:

1. A computer-implemented method for interpreting a frame definition, the frame definition comprising at least one data field and at least one goal, to control a dialog with a user, the method comprising:
   receiving information input from the user;
   updating frame data associated with the frame definition dependent upon the information input from the user;
   determining that at least one goal of the frame definition is activated, wherein a goal is activated when at least one field referred to inside the goal has been modified;
   selecting a goal that has been determined to be activated;
   if the selected activated goal is satisfied:
      evaluating final rules of the frame definition; and
      completing the interpretation of the frame definition; and
   if the selected activated goal is not satisfied:
      selecting an unfilled data field in the goal; and
      generating an output to the user using information in the frame definition that is associated with the selected unfilled data field.

2. A method in accordance with claim 1 wherein the information input from the user is a speech utterance.

3. A method in accordance with claim 1 wherein generating an output to the user using information in the frame definition that is associated with the selected unfilled data field comprises generating a prompt associated with the selected unfilled data field.

4. A method in accordance with claim 1 wherein updating the frame data dependent upon the information input from the user activates a goal.

5. A method in accordance with claim 1 wherein the frame comprises a plurality of goals, the method further comprising:
   detecting if an alternative goal of the plurality of goals is activated as a result of user input; and
   using the alternative goal to guide the dialog.

6. A system operable to control a dialog with a user to update frame data associated with a frame definition, the system comprising:
   a memory operable to store at least one data field and at least one goal of the frame definition;
   a user input module;
   a user output module; and
   a processor operable to receive user information from the user input module, to update the frame data dependent upon the user information, to determine that at least one goal of the frame definition is activated, wherein a goal is activated when at least one field referred to inside the goal has been modified, to select a goal that has been determined to be activated, and to generate an output to the user output module dependent upon the selected activated goal.

7. A system in accordance with claim 6 wherein the frame definition comprises:
   at least one data field; and
   a goal comprising a Boolean function of one or more filled predicates, each of which takes a reference to a field of the at least one data field as its argument, wherein the goal is satisfied during a dialog if the Boolean function evaluates to true.

8. A system in accordance with claim 7 wherein the frame definition further comprises prompts and grammars associated with the at least one data field.

9. A system in accordance with claim 7 wherein the frame definition further comprises rules associated with the at least one data field.

10. A system in accordance with claim 6 wherein a data field of the at least one data field is a complex data field comprising a frame information structure.

\* \* \* \* \*